US011898894B2

(12) United States Patent
Murphy

(10) Patent No.: US 11,898,894 B2
(45) Date of Patent: Feb. 13, 2024

(54) QUALITY AND QUANTITY SENSOR WITH REDUNDANT LOW QUANTITY MEASUREMENT

(71) Applicant: SSI Technologies, LLC, Janesville, WI (US)

(72) Inventor: Gregory P. Murphy, Janesville, WI (US)

(73) Assignee: SSI TECHNOLOGIES, LLC, Janesville, WI (US)

( * ) Notice: Subject to any disclaimer, the term of this patent is extended or adjusted under 35 U.S.C. 154(b) by 66 days.

(21) Appl. No.: 17/411,375

(22) Filed: Aug. 25, 2021

(65) Prior Publication Data

US 2023/0061414 A1 Mar. 2, 2023

(51) Int. Cl.
G01F 23/296 (2022.01)
G01F 23/2962 (2022.01)
G01F 23/80 (2022.01)

(52) U.S. Cl.
CPC ...... G01F 23/2968 (2013.01); G01F 23/2962 (2013.01); G01F 23/802 (2022.01)

(58) Field of Classification Search
None
See application file for complete search history.

(56) References Cited

U.S. PATENT DOCUMENTS

| | | | |
|---|---|---|---|
| 8,733,153 B2 * | 5/2014 | Reimer | G01F 23/2965 73/61.49 |
| 9,038,442 B2 | 5/2015 | Reimer et al. | |
| 9,488,514 B2 | 11/2016 | Murphy | |
| 9,664,552 B2 | 5/2017 | Reimer et al. | |
| 9,897,477 B2 * | 2/2018 | Maguin | G01F 25/20 |
| 2004/0007061 A1 * | 1/2004 | Forgue | G01F 23/2968 73/290 V |
| 2007/0203668 A1 * | 8/2007 | Reimer | G01F 23/2962 702/159 |
| 2012/0118059 A1 * | 5/2012 | Reimer | G01N 29/024 73/290 V |
| 2014/0196536 A1 * | 7/2014 | Murphy | G01F 23/802 73/290 V |
| 2016/0041024 A1 * | 2/2016 | Reimer | G01F 23/2962 73/290 V |

* cited by examiner

*Primary Examiner* — Kristina M Deherrera
*Assistant Examiner* — Mark A Shabman
(74) *Attorney, Agent, or Firm* — Michael Best & Friedrich LLP

(57) ABSTRACT

A fluid sensing system includes a target positioned at a target level, a first transducer configured to generate a first sound wave, and a second transducer configured to generate a second sound wave. An electronic processor is configured to produce a first signal to drive the first transducer and receive a first indication of a detected first echo from the first transducer. The electronic processor is configured to determine a first level of the fluid and determine whether the first level is less than or equal to the target level. The electronic processor is configured to produce, in response to determining the first level is less than or equal to the target level, a second signal to drive the second transducer, receive a second indication of a detected second echo from the second transducer, and determine a second level of the fluid based on the second indication.

11 Claims, 9 Drawing Sheets

QUALITY AND QUANTITY SENSOR WITH REDUNDANT LOW QUANTITY MEASUREMENT

BACKGROUND

Embodiments relate to ultrasonic level and/or concentration sensors and systems.

Ultrasonic transducers can be used to measure a level of a liquid or fluid in a tank. For example, an ultrasonic sensor may be positioned in a tank containing a fluid. In some situations, a transducer is positioned at the top or bottom of the tank. The tank may contain fuel or another fluid and be designed for use in an automobile, truck, or other vehicle. An ultrasonic signal is generated by the transducer. The time it takes for the signal to travel from the transducer to the surface of the fluid, reflect off the surface of the fluid, and return to the transducer is measured. The level of fluid can be determined based on this travel time.

SUMMARY

There is an increasing use of advanced driver assistance systems (ADASs) (for example, collision avoidance and adaptive cruise control) in vehicles, for example, passenger vehicles. The increased use of these systems has resulted in a high number of computer-controlled braking events and a higher number of braking events overall (human-initiated and computer-controlled). At the same time, as vehicles become more automated, vehicle owners may be less involved in or interested in routine maintenance tasks, for example, checking the level and quality of vehicle fluids, for example, engine oil and brake fluid. With a decrease in human interaction and attention to vehicle fluids including brake fluid used in vehicle braking systems, it is important to monitor the quantity and quality of brake fluid within a braking system fluid reservoir. Monitoring the quantity of brake fluid helps to ensure that there is sufficient brake fluid for proper functioning of brake hydraulics (for example, movement of brake calipers). Monitoring the quantity of brake fluid may also assist in determining maintenance events of a vehicle braking system, for example determining the extent of brake pad wear. Additionally, monitoring the quality of the brake fluid helps avoid situations where the fluid is degraded and boils under hot conditions or freezes under cold conditions.

Proposed systems may use at least two transducers to provide primary and secondary measurements of the brake fluid. In one example, a first transducer measures the quantity of the brake fluid. A second transducer measures the quality of the brake fluid. However, when the quantity of the fluid reaches a low level (for example, a predetermined level), the quality measurements are disabled and the second transducer functions as a secondary (or redundant) quantity transducer. By monitoring the quantity of the brake fluid with both transducers, the system provides a redundant indication of when the brake fluid reaches a critical low level and needs to be replenished.

One embodiment provides a fluid sensing system that includes a target positioned at a target level. The system also includes a first transducer that is configured to generate a first sound wave in a vertical direction and to detect a first echo of the first sound wave. The system also includes a second transducer configured to generate a second sound wave in the vertical direction and to detect a second echo of the second sound wave. An electronic processor is configured to produce a first signal to drive the first transducer to produce the first sound wave and receive a first indication of the first echo from the first transducer. The electronic processor is also configured to determine a first level of the fluid based on the first indication and determine whether the first level of the fluid is less than or equal to the target level. The electronic processor is also configured to produce, in response to determining the first level of the fluid is less than or equal to the target level, a second signal to drive the second transducer to produce the second sound wave, receive a second indication of the second echo from the second transducer, and determine a second level of the fluid based on the second indication.

Another embodiment provides a fluid sensing system that includes a target positioned at a target level, a first transducer configured to generate a first sound wave in a vertical direction and to detect a first echo of the first sound wave, and a second transducer configured to generate a second sound wave in the vertical direction and to detect a second echo of the second sound wave. An electronic processor is configured to produce a first signal to drive the first transducer to produce the first sound wave and receive a first indication of the first echo from the first transducer. The electronic processor is also configured to determine a first level of the fluid based on the first indication and determine whether the first level of the fluid is less than or equal to the target level. The electronic processor is also configured to operate in a first mode when the first level of the fluid is less than or equal to the target level and operate in a second mode when the first level of the fluid is greater than the target level. When the electronic processor is operating in the first mode, the electronic processor operates the second transducer to confirm the first level of the fluid. When the electronic processor is operating in the second mode, the electronic processor operates the second transducer to determine a concentration level of the fluid.

Another embodiment provides a fluid sensing system comprising a first sensing area and a second sensing area. The first sensing area includes a first transducer configured to generate a first sound wave in a vertical direction and to detect a first echo of the first sound wave and a focus tube configured to direct the first sound wave in the vertical direction. The second sensing area includes a second transducer configured to generate a second sound wave in the vertical direction and to detect a second echo of the second sound wave and a target positioned at a target level. An electronic processor is coupled to the first transducer and the second transducer. The electronic processor is configured to produce a first signal to drive the first transducer to produce the first sound wave and receive a first indication of the first echo from the first transducer. The electronic processor is also configured to determine a level of the fluid based on the first indication and determine whether the first level of the fluid is less than or equal to the target level. When the first level of the fluid is greater than the target level, the electronic processor operates the second transducer to determine a concentration level of the fluid. When the first level of the fluid is less than the target level, the electronic processor operates the second transducer to determine a second level of the fluid.

It should be noted that embodiments are applicable to a variety of fluids, including but not limited to, brake fluid, gasoline, diesel, engine oil, hydraulic fluid, and transmission fluid.

Other features, aspects, and benefits of various embodiments will become apparent by consideration of the detailed description and accompanying drawings.

DETAILED DESCRIPTION

Figure 1A:
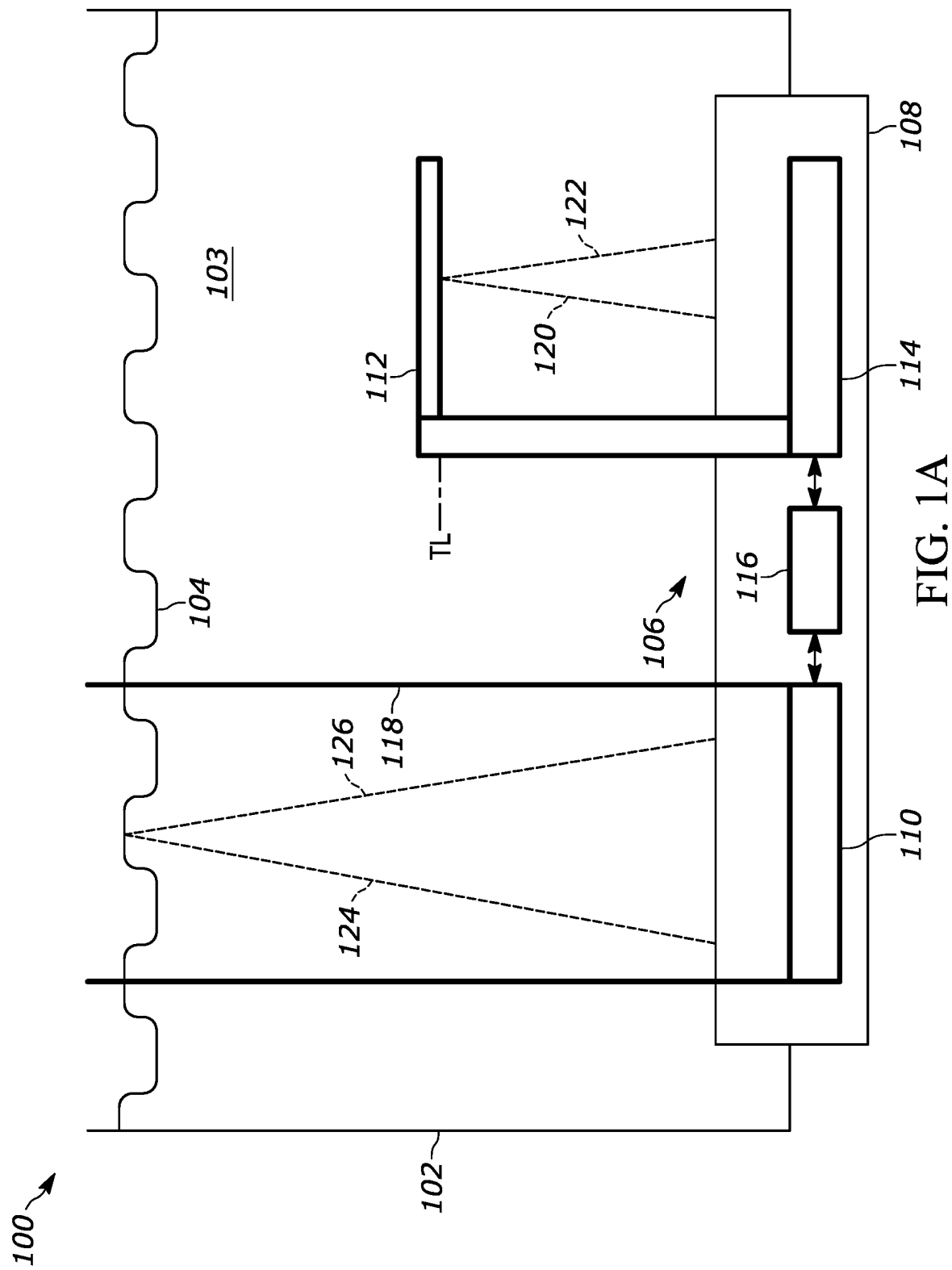
FIG. 1A is a schematic diagram (from a side perspective) of an apparatus for sensing and transporting a fluid according to one embodiment.

One or more embodiments are described and illustrated in the following description and accompanying drawings. These embodiments are not limited to the specific details provided herein and may be modified in various ways. Furthermore, other embodiments may exist that are not described herein. For example, a device or structure that is "configured" in a certain way is configured in at least that way but may also be configured in ways that are not listed. Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not include a transitory, propagating signal. Accordingly, non-transitory computer-readable medium may include, for example, a hard disk, a CD-ROM, an optical storage device, a magnetic storage device, ROM (Read Only Memory), RAM (Random Access Memory), register memory, a processor cache, other memory and storage devices, or combinations thereof.

In addition, the phraseology and terminology used herein is for the purpose of description and should not be regarded as limiting. For example, the use of "including," "containing," "comprising," "having," and variations thereof herein is meant to encompass the items listed thereafter and equivalents thereof as well as additional items. The terms "connected" and "coupled" are used broadly and encompass both direct and indirect connecting and coupling. Further, "connected" and "coupled" are not restricted to physical or mechanical connections or couplings and can include electrical connections or couplings, whether direct or indirect. In addition, electronic communications and notifications may be performed using wired connections, wireless connections, or a combination thereof and may be transmitted directly or through one or more intermediary devices over various types of networks, communication channels, and connections. Moreover, relational terms, for example, first and second, top and bottom, and the like may be used herein solely to distinguish one entity or action from another entity or action without necessarily requiring or implying any actual such relationship or order between such entities or actions.

In some embodiments, method steps are conducted in an order that is different from the order described.

Although the invention described herein can be applied to, or used in conjunction with a variety of fluids, fuels and oils (for example, gasoline, diesel, engine oil, hydraulic fluid, transmission fluid, etc.), embodiments of the invention described herein are described with respect to brake fluid for use within a braking system.

Figure 1B:
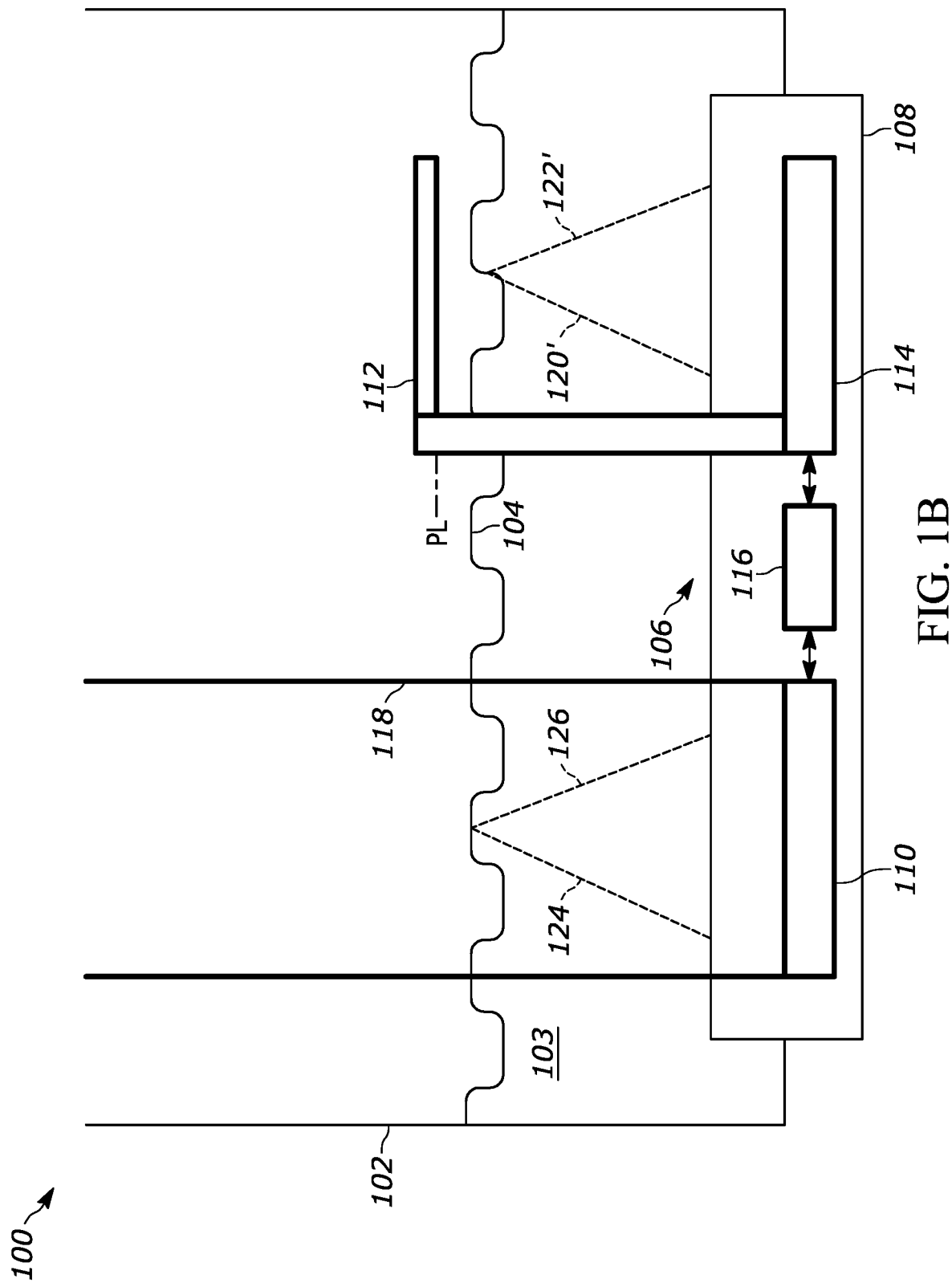
FIG. 1B is another schematic diagram of the apparatus of FIG. 1A illustrating a situation where a fluid level has dropped below a known or predetermined level.

FIGS. 1A-1B illustrate a sensing system 100 including a tank 102 and an ultrasonic sensor 106. The sensor 106 can provide information regarding the level, concentration, or both of a fluid 103. In the illustrated embodiments, the sensor 106 is positioned at the bottom of a tank 102 or similar container filled with the fluid 103, for example brake fluid. The fluid 103 has a top surface 104. The level of the top surface 104 changes over time as the fluid 103 is consumed, as may be seen by reference to FIG. 1A and FIG. 1B. The sensor 106 includes a housing 108, a first transducer 110 (for example, a first piezoelectric transducer), a second transducer 114 (for example, a second piezoelectric transducer), a controller 116, and a reference point or target 112. The target 112 is located at a predetermined level (marked as target level "TL" in FIGS. 1A-1B). The predetermined level may be stored as a constant within the memory 204 (see FIG. 2). The controller 116 may further be coupled to additional components within the housing 108, as described in more detail below.

Signals from the controller 116 (which may be amplified or otherwise conditioned by a driver circuit) are provided to both the first transducer 110 and the second transducer 114. In some embodiments, the controller 116 generates a first signal to drive the first transducer 110 and a second signal to drive the second transducer 114. In some embodiments, the controller 116 operates the first and second transducers 110 and 114 in a manner that provide continuous measurements, for example, measure that are repeated regularly (for example, every X ms in the case of level measurements and every Y ms in the case of quality or concentration measurements). Although the transducers 110 and 114 and the controller 116 are located in a single housing 108 in FIG. 1A, in other embodiments the transducers 110 and 114 and the controller 116 may be located in separate housings, may be located in the fluid without one or more housings, or may be situated in other locations with respect to the tank 102 (for example, and not by way of limitation, the transducers 110 and 114 may be integrated with or on the tank 102 and the controller 116 may be located at the tank or at a different location in the automobile system). Additionally, another computer within the automobile system may also perform the functions of controller 116 described herein. In some embodiments, multiple computers, processors, or controllers may work together to perform the operations described with respect to controller 116.

The first transducer 110 generates an ultrasonic sound wave (represented by dashed line 124) that propagates through the fluid 103. The ultrasonic sound wave is reflected from the top surface 104 (represented by dashed line 126) back to the first transducer 110. In response to receiving the reflections, the first transducer 110 generates an electric signal that is provided to the controller 116. The signal from the first transducer 110 is then processed by the controller 116, as described in more detail below.

The second transducer 114 also generates an ultrasonic sound wave (represented by dashed line 120) that propagates through the fluid 103. When the top surface 104 is above the target 112 (see FIG. 1A), the ultrasonic sound wave is reflected from the target 112 (represented by dashed line 122) back to the second transducer 114. When the top surface 104 is below the target 112 (see FIG. 1B), the ultrasonic sound wave (represented by dashed line 120') is reflected from the top surface 104 (represented by dashed line 122') back to the second transducer 114. In response to receiving the reflections (or echoes), the second transducer 114 generates an electric signal that is provided to the controller 116. The signal from the second transducer 114 is then processed in the controller 116, as described in more detail below. The angular orientation of sound waves in the appended figures (e.g., sound waves 124, 126, 120 and 122 in FIG. 1A) is for illustrative purposes, and in practice the sound waves may travel at other suitable angular orientations.

A focus tube 118 extends vertically from the housing 108 and above the first transducer 110. Ultrasonic sound waves generated by the first transducer 110 are contained within the focus tube 118. Ultrasonic sound waves generated by the first transducer 110 are kept separate from the ultrasonic sound waves generated by the second transducer 114 via the walls of the focus tube 118. Accordingly, the focus tube 118 helps reduce interference between the ultrasonic sound waves generated by the first transducer 110 and ultrasonic sound waves generated by the second transducer 114. In some embodiments, in addition to or in replace of the focus tube 118, an additional focus tube is placed above and around the second transducer 114. In some embodiments, in substitution of or in addition to the focus tube 118, the controller 116 "blanks out" or ignores signals received by the second transducer 114 when the first transducer 110 is excited, or vice versa. By ignoring signals during this time period, potential interference between the first transducer 110 and the second transducer 114 is reduced.

Figure 1C:
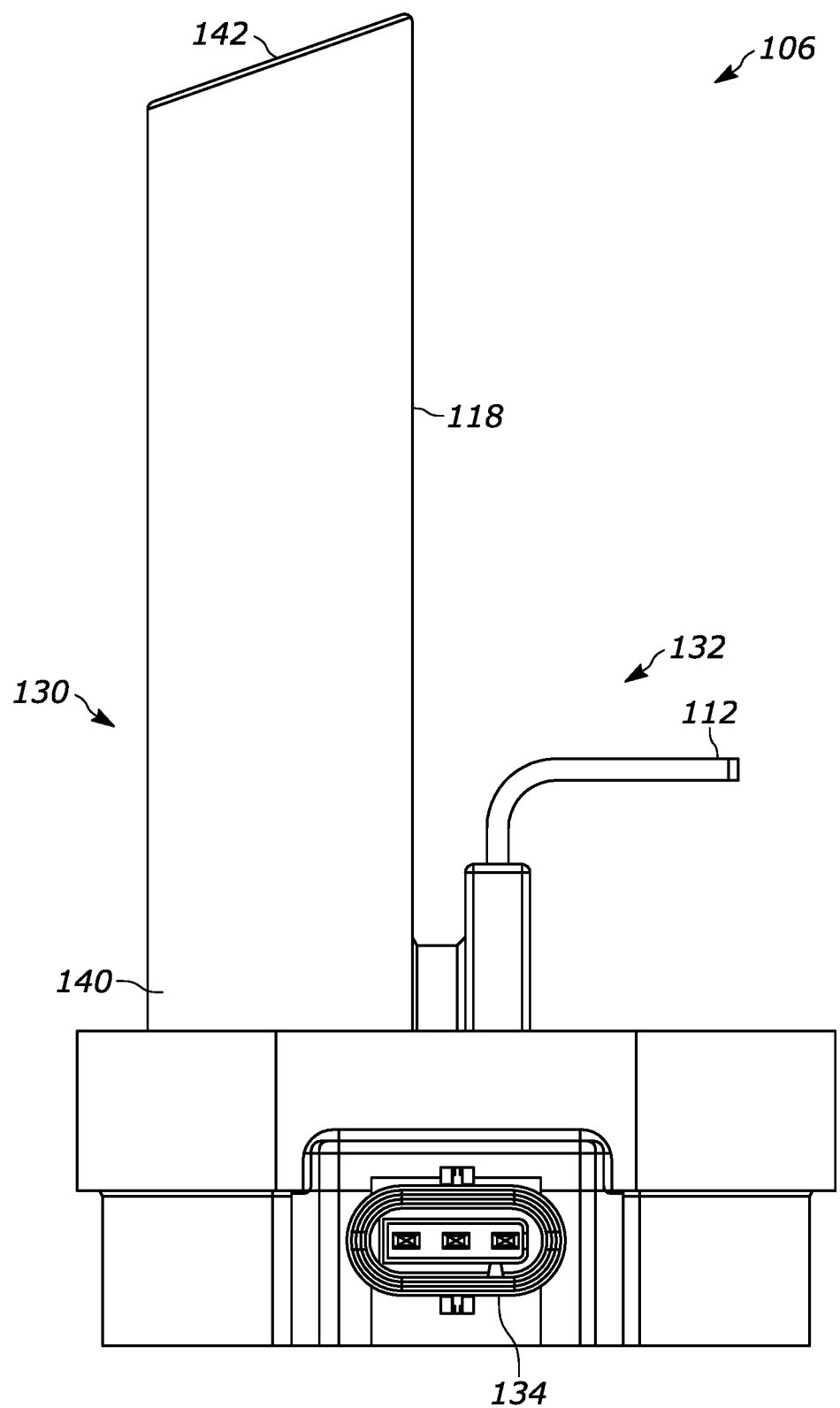
FIG. 1C is a front view of the apparatus for sensing and transporting a fluid according to another embodiment.
Figure 1D:
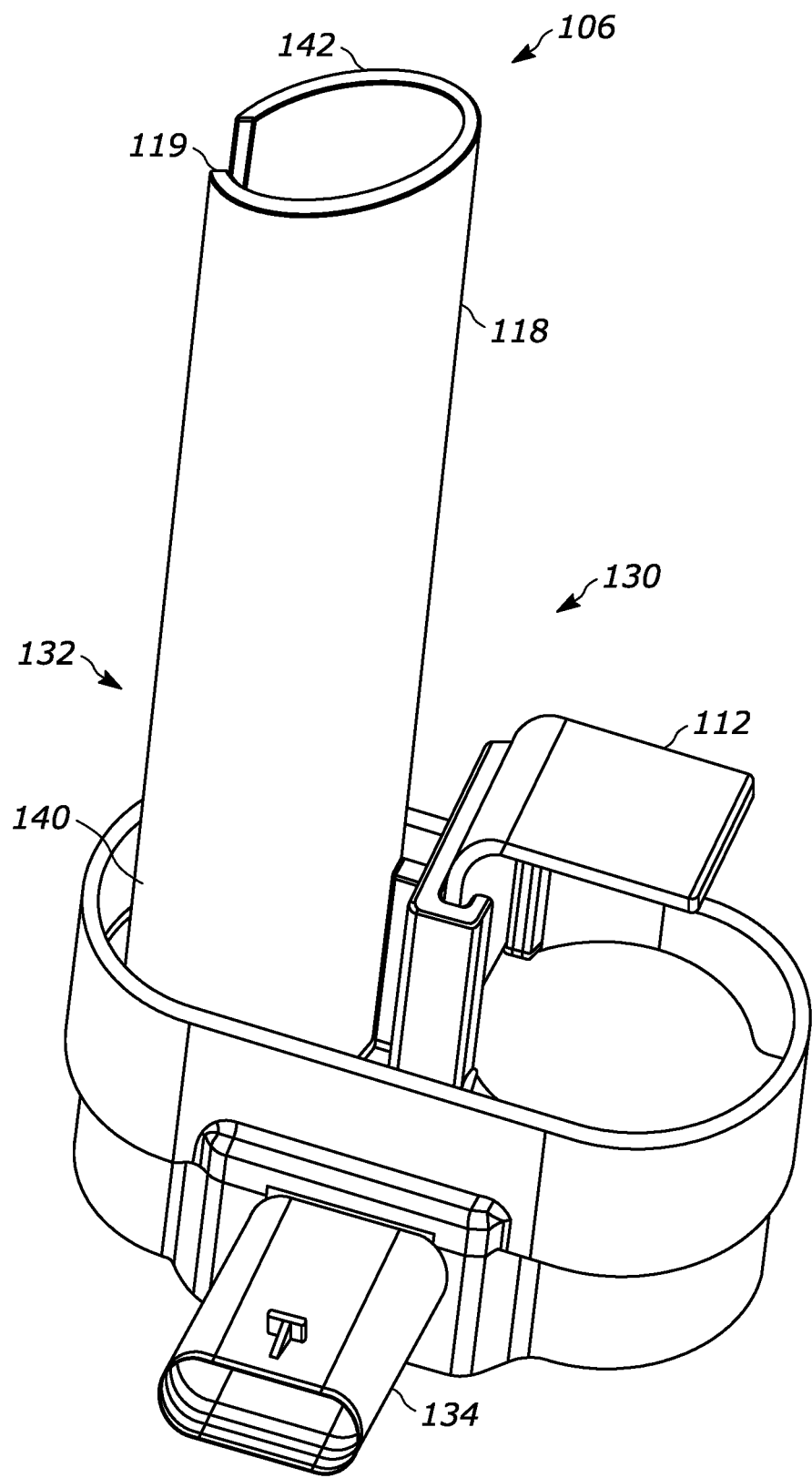
FIG. 1D is a perspective view of the apparatus of FIG. 1C according to one embodiment.

FIGS. 1C-1D illustrate the sensor 106 in more detail. The sensor 106 includes a first sensing portion 130 and a second sensing portion 132. The first sensing portion 130 includes the first transducer 110 (not shown) and the focus tube 118. The second sensing portion 132 includes the second transducer 114 (not shown) and the target 112. In some embodiments, the sensor 106 also includes an electrical interface 134 (for example, a plug connector or receptacle) through which the sensor 106 provides outputs to an external device.

The focus tube 118 may include a slit 119 to allow the fluid 103 to enter the focus tube 118. The slit 119 may be a hole in a side of the focus tube 118 that extends the entire length of the focus tube 118 (defined by the distance between a bottom portion 140 (or base portion) and a top portion 142). Additionally, in some embodiments, the focus tube 118 may have a greater diameter at the bottom portion 140 compared to the top portion 142. Accordingly, the focus tube 118 may narrow over its vertical length. In some embodiments, the top portion 142 of the focus tube 118 is open to allow the fluid 103 to enter from the top of the focus tube 118.

Figure 2:
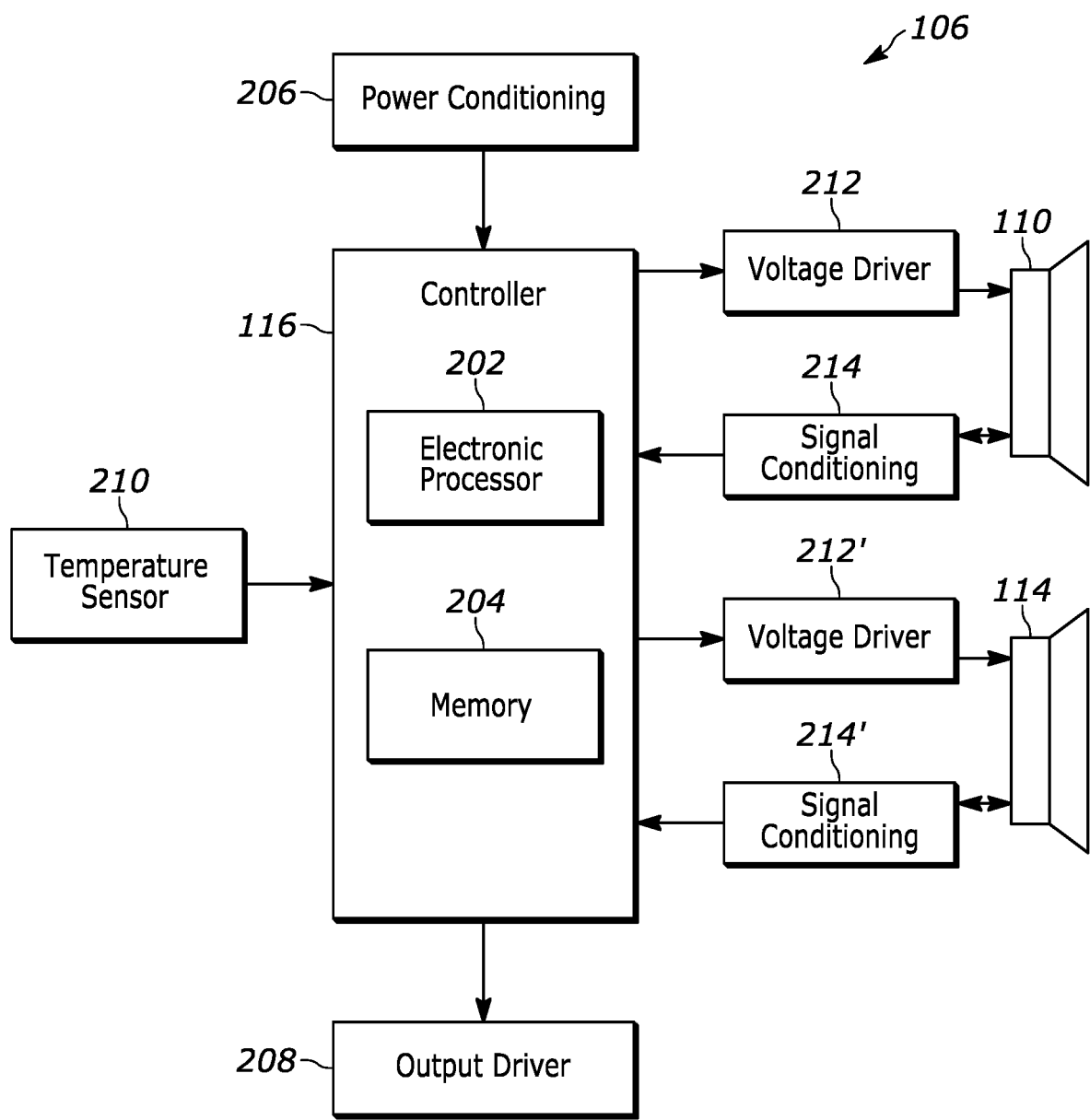
FIG. 2 is a block diagram for a control system of the apparatus of FIGS. 1A-1D according to one embodiment.

FIG. 2 illustrates a block diagram of the sensor 106. In the example illustrated, the sensor 106 includes the controller 116, a power conditioning circuit 206, an output driver 208, a temperature sensor 210, the first transducer 110, and the second transducer 114. The controller 116 includes an electronic processor 202 (for example, a programmable microprocessor, a microcontroller, programmable logic controller, or other suitable device) and a memory 204. The controller 116 receives power via the power conditioning circuit 206.

The controller 116 may provide output signals to the output interface 134 via the output driver 208.

The memory 204 is a non-transitory computer readable medium that includes, for example, a program storage area and a data storage area. The program storage area and the data storage area can include combinations of different types of memory, for example read-only memory ("ROM"), random access memory ("RAM") (for example, dynamic RAM ["DRAM"], synchronous DRAM ["SDRAM"], etc.), electrically erasable programmable read-only memory ("EEPROM"), flash memory, a hard disk, an SD card, or other suitable magnetic, optical, physical, or electronic memory devices. In one example, the electronic processor 202 is connected to the memory 204 and executes software instructions that are capable of being stored in a RAM of the memory 204 (for example, during execution), a ROM of the memory 204 (for example, on a generally permanent basis), or another non-transitory computer-readable medium. Software included in the implementation of the sensor 106 can be stored in the memory 204. The software includes, for example, firmware, one or more applications, program data, filters, rules, one or more program modules, and other executable instructions. The electronic processor 202 is configured to retrieve from the memory 204 and execute, among other things, instructions related to the control processes and methods described herein. In other constructions, the sensor 106 includes additional, fewer, or different components.

The temperature sensor 210 provides the controller 116 with information indicative of the temperature of the fluid 103. The controller 116 uses the temperature information from the temperature sensor 210 to compensate for variations in the speed of sound that occur as a result of changes in temperature.

To operate the first transducer 110, the controller 116 generates a transducer control signal, which is delivered to a first voltage driver 212 electrically coupled to the first transducer 110. The first voltage driver 212 amplifies or otherwise conditions the control signal from controller 116 and provides the conditioned signal to the first transducer 110. When energized (for example, excited) by the amplified signal, the first transducer 110 produces an output sound wave or, more particularly, an ultrasonic sound wave. In addition to generating sound waves, the first transducer 110 also responds to sound waves (for example reflections or echoes) by converting the received sound waves into electrical signals. The electrical signals, sometimes referred to as echo signals, are indicative of the quantity or quality being monitored or measured. In one embodiment, the echo signals are first conditioned by a first signal conditioning circuit 214. The echo signals are provided to the controller 116. In one embodiment and to provide a more technically detailed description of said embodiment, in response to the echo signal, the controller 116 may generate an output signal indicative of the elapsed time between the moment the first transducer 110 sent out its ultrasonic signal (based on the transducer control signal) and the moment the first transducer 110 received a reflection of the ultrasonic signal (resulting in the generation of an echo signal). This "time of flight" (the time between generation of the ultrasonic sound wave or ping and receipt of the reflection or echo), along with the speed of sound within the fluid 103 in the tank 102, can be used to determine the distance from the sensor 106 to the top surface 104 and/or the concentration of the fluid 103.

The controller 116 operates the second transducer 114 in a manner similar to the first transducer 110. For example, the controller 116 generates a transducer control signal which is delivered to the second voltage driver 212'. The second voltage driver 212' amplifies or otherwise conditions the control signal from the controller 116 and provides the conditioned signal to the second transducer 114. When energized by the amplified signal, the second transducer 114 produces an output sound wave. In addition to generating sound waves, the second transducer 114 also responds to sound waves by converting the received sound waves into electric signals (for example, an echo signal, a reflection signal). Such signals are conditioned by a second signal conditioning circuit 214' and are provided to the controller 116.

The time between the transmitted ultrasonic pulse and the received echo is proportional to the distance the sound wave traveled through the fluid 103 as expressed by the equation: Distance=(Speed of Sound)×(Time of Flight)/2. As noted, above the output signal of the transducer (e.g., the electrical signals, the echo signals, or the reflection signals) provides an indication of the time of flight. However, to provide a more detailed explanation, if more information is available and programmed into the controller, the distance measurement may also be used to determine the volume of fluid 103 in the tank 102. In some embodiments, the controller 116 modulates the power level of the output sound wave from the first transducer 110 so that the minimum power level to receive an echo is used. By modulating the power level, multiple echoes are prevented from affecting the time of flight.

The speed of sound of the fluid 103 can be determined using the reflection of the sound wave off the target 112. The speed of sound of the fluid 103 is proportional to the distance the sound wave has traveled and the time of flight. Because the target 112 is at a known distance from the second transducer 114 (for example, the distance between the second transducer 114 and the target level TL), the distance the sound waves travel is known. The time of flight of the reflection is determined as discussed above. Therefore, the speed of sound of the fluid 103 can be determined by the equation: Speed of Sound=(2×Distance)/(Time of Flight). The speed of sound may further vary based on the temperature of the fluid 103. Accordingly, the controller 116 may account for the temperature of the fluid 103 (based on temperature signals received from the temperature sensor 210) when calculating the speed of sound. While the target 112 is at a known distance, the distance travelled by ultrasonic sound waves produced by the first transducer 110 is variable. Accordingly, the controller 116 may use the speed of sound calculated from the time of flight of ultrasonic sound waves produced by the second transducer 114 to determine the distance travelled by ultrasonic sound waves produced by the first transducer 110 to determine fluid level.

Figure 4:
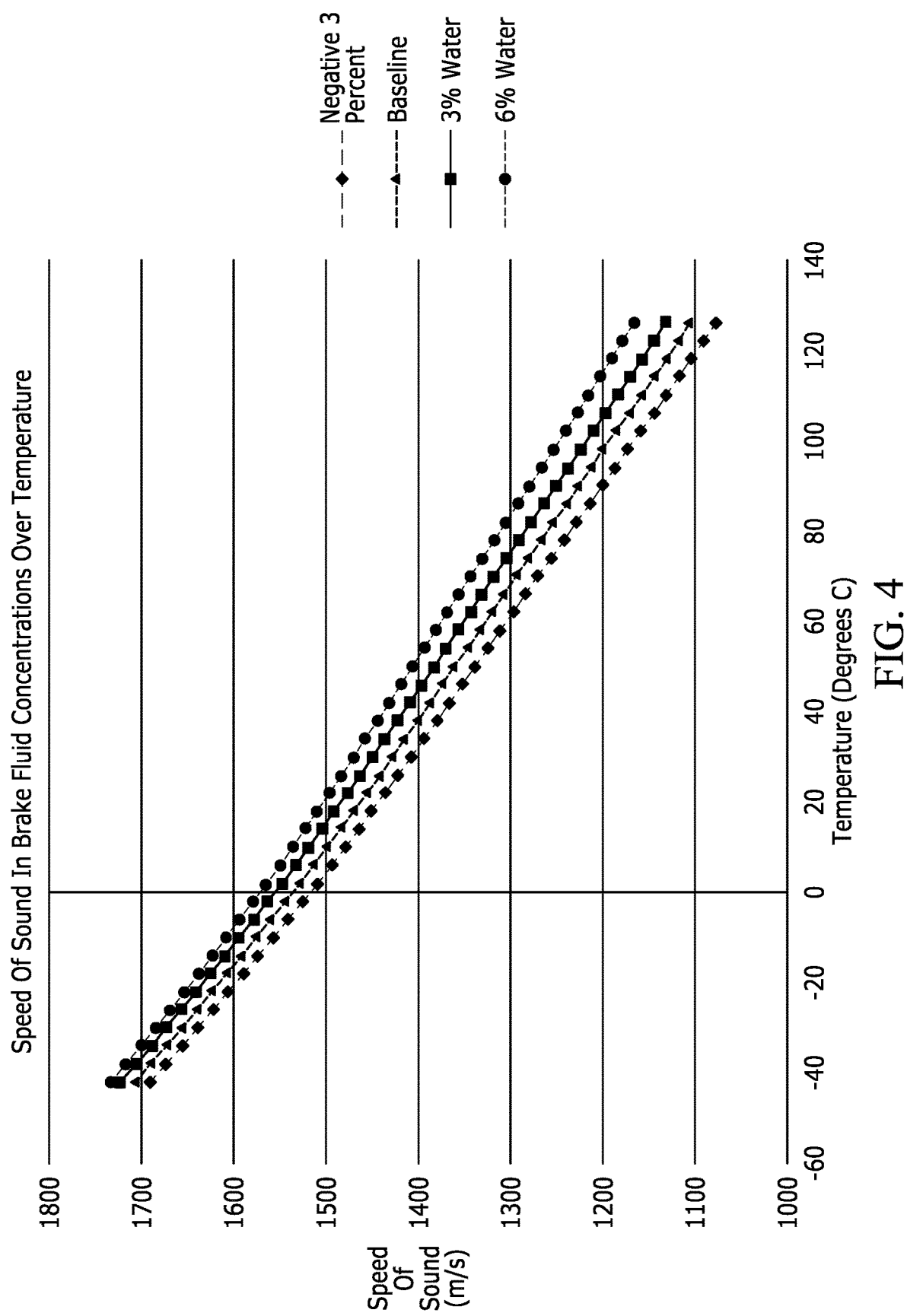
FIG. 4 is a chart of the speed of sound versus temperature for various brake fluid concentrations.

The controller 116 determines the concentration of the fluid 103 by using the calculated speed of sound and the temperature of the fluid 103. The temperature of the fluid 103 may be determined based on temperature signals provided by the temperature sensor 210 or an expected temperature (for example, a default temperature) stored in the memory 204. The controller 116 may apply the calculated speed of sound and the determined temperature to a look-up table stored in the memory 204 to determine the concentration of the fluid 103. The look-up table may be similar to that shown in FIG. 4.

In one example, the sensor 106 has at least two independent modes of operation. The mode of operation depends on the level of the fluid 103 in the tank 102 in relation to the level of the target 112. The target 112 and the top surface 104 of the fluid 103 may be located at one of three general positions or levels within the tank 102. First, the level of the top surface 104 of the fluid 103 may be above the target 112. Second, the level of the top surface 104 of the fluid 103 may be near or at substantially the same level as the target 112. Third, the level of the top surface 104 of the fluid 103 may be below the level of the target 112. The controller 116 may operate in a first mode of operation when the top surface 104 of the fluid 103 is above or near the level of the target 112, for example, at the same level as the level of the target 112 or at a level within a predetermined range of the level of the target 112. The controller 116 operates in a second mode of operation when the top surface 104 of the fluid 103 is below the level of the target 112.

Figure 3A:
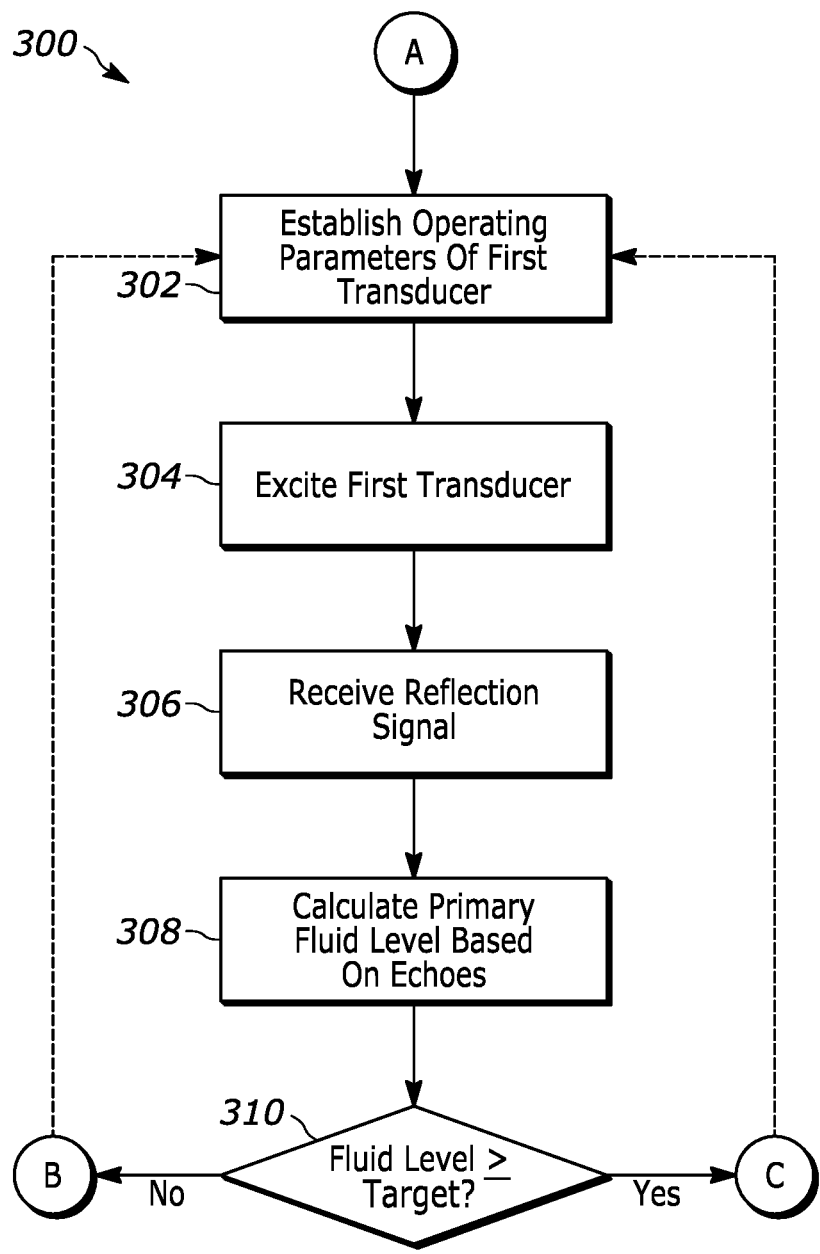
FIGS. 3A-3C are a flow charts that illustrate a method performed by the control system of FIG. 2 according to one embodiment.
Figure 3B:
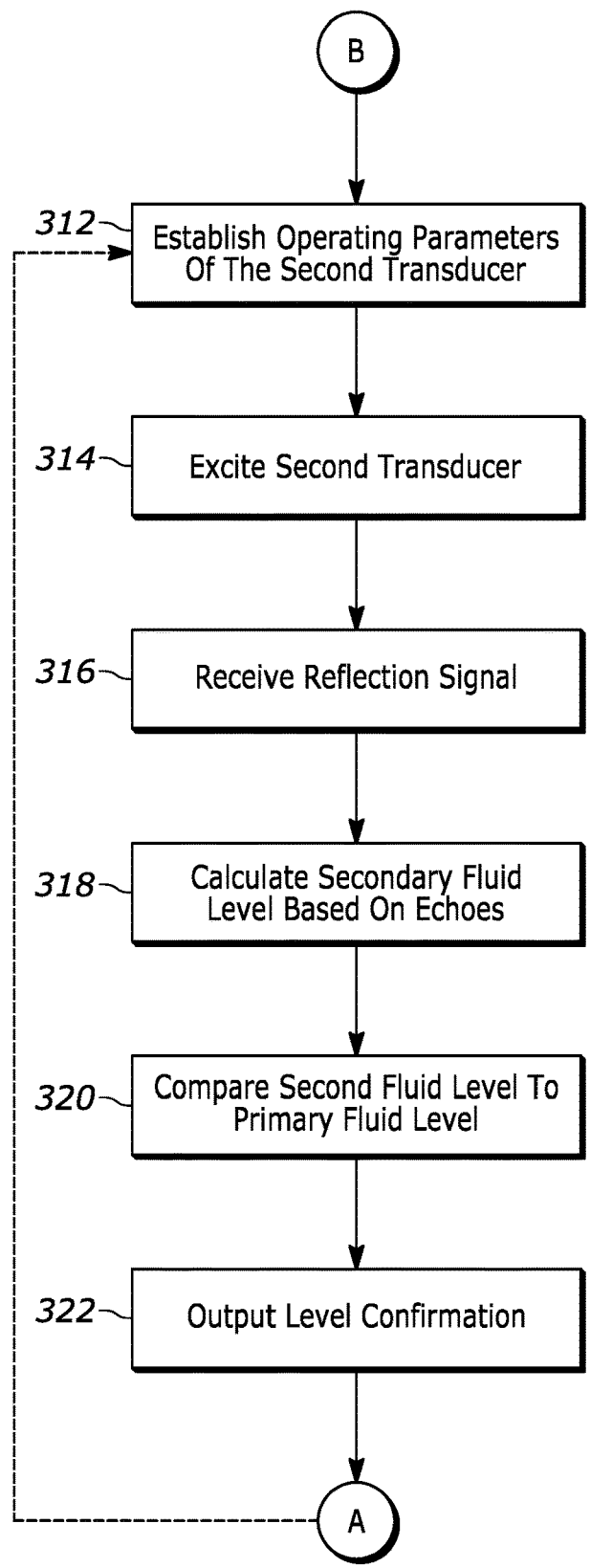
Figure 3C:
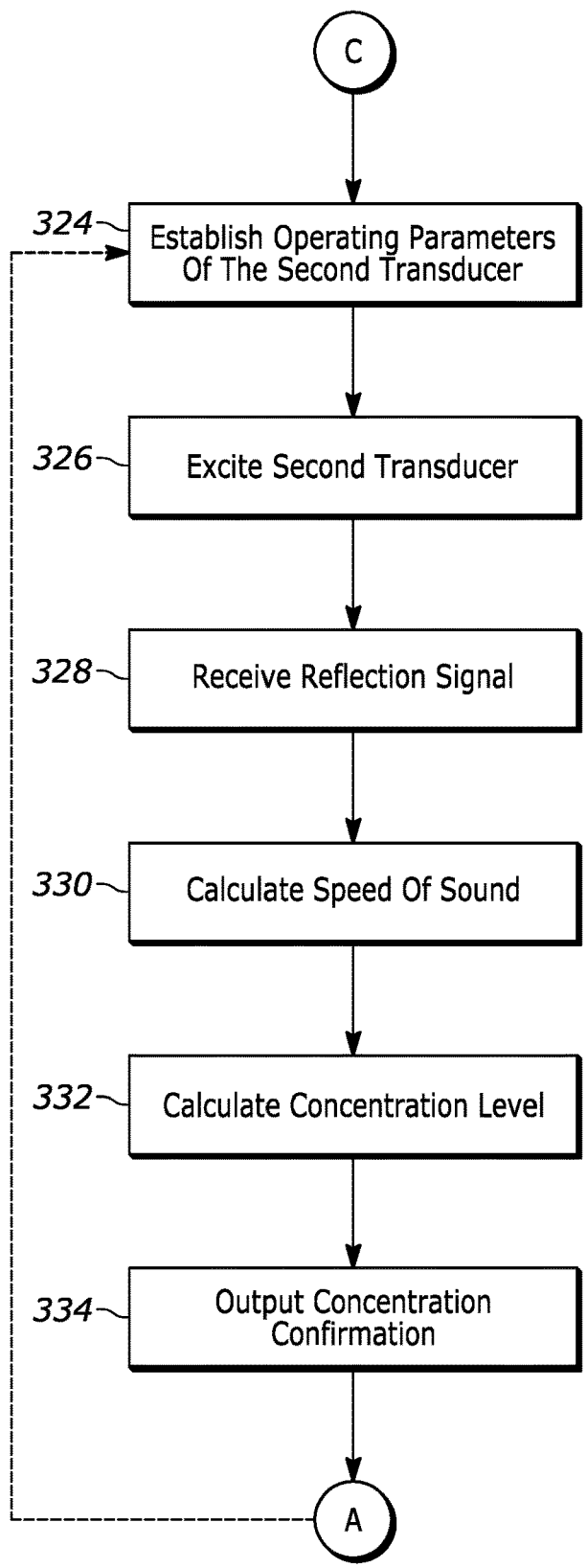

In one example, the controller 116 uses the two modes of operation to confirm the level of the fluid 103, determine the concentration of the fluid 103, and to detect any errors of operation of the sensor 106 or the sensing system 100. FIGS. 3A-3C illustrate a flow chart of an example method 300 performed by the controller 116. The method 300 may include more or fewer steps than those illustrated and described. Additionally, steps may be performed in a different order than illustrated and described. While illustrated and described as being performed serially, the controller 116 may perform steps in parallel (for example, concurrently). At block 302, the controller 116 establishes operating parameters for the first transducer 110. The operating parameters may include, for example, an excitation level of the first transducer 110, a gain level of the first transducer 110, and threshold levels for the first transducer 110. These may establish, among other things, an amplitude of an ultrasonic sound wave the first transducer 110 produces and an amplitude that an echo needs to be detected by the first transducer 110.

At block 304, the controller 116 drives or excites the first transducer 110 to produce an ultrasonic sound wave (for example, a first sound wave), as previously described. The first transducer 110 is excited based on the established operating parameters (at block 302). At block 306, the controller 116 receives a reflection signal from the first transducer 110, as previously described. At block 308, the controller 116 calculates the level of the top surface 104 (for example, the "primary" level) based on the time of flight. Specifically, the controller 116 may calculate the distance the produced ultrasonic sound wave travelled, as previously described.

At block 310, the controller 116 determines whether the level of the top surface 104 is greater or equal to the level of the target 112. If the level of the top surface 104 is less than the level of the target 112, the controller 116 proceeds to block 312 (see FIG. 3B). If the level of the top surface 104 is greater than or equal to the level of the target 112, the controller 116 proceeds to block 324 (see FIG. 3C).

In some embodiments, at block 310, the controller 116 determines whether the level of the top surface 104 is greater than the level of the target 112. If the level of the top surface 104 is less than or equal to the level of the target 112, the controller 116 proceeds to block 312 (see FIG. 3B). If the level of the top surface 104 is less than or equal to the level of the target 112, the controller 116 proceeds to block 324 (see FIG. 3C).

In the example provided, following completion of block 310, the controller 116 returns to block 302 (indicated by the dashed lines in FIG. 3A) while also simultaneously continuing to either block 312 or block 324. Accordingly, the controller 116 performs several operations in parallel. Specifically, the controller 116 may perform the operations of blocks 302-310 concurrently with blocks 312-322, or the controller 116 may perform the operations of block 302-310 concurrently with blocks 324-334.

If the top surface 104 is less than the level of the target 112, at block 312, the controller 116 establishes operating parameters for the second transducer 114. The operating parameters may include, for example, an excitation level of the second transducer 114, a gain level of the second transducer 114, and threshold levels for the second transducer 114. These may establish, among other things, how strong of an ultrasonic sound wave the second transducer 114 produces and what strength (for example, amplitude) an echo needs to be detected by the second transducer 114. At block 314, the controller 116 excites the second transducer 114 to generate an ultrasonic sound wave (for example, a second sound wave), as previously described. The second transducer 114 is excited based on the established operating parameters (at block 312). At block 316, the controller 116 receives a reflection signal from the second transducer 114, as previously described. At block 318, the controller 116 calculates the level of the top surface 104 (for example, the "secondary" level) based on the time of flight (for example, the time period between exciting the second transducer 114 and receiving the reflection signal). Accordingly, the controller 116 uses the second transducer 114 to provide a redundant fluid level measurement. When the top surface 104 is less than the level of the target 112, the speed of sound cannot be determined from the reflection off of the target 112. Instead, the speed of sound is determined by using a look-up table based on the temperature of the fluid 103. The controller 116 then determines the level of the top surface 104 by comparing the speed of sound and time of flight to a look-up table stored in the memory 204.

At block 320, the controller 116 compares the primary level and the secondary level of the top surface 104. The primary level is the level determined based on excitement of the first transducer 110, and the secondary level is the level determined based on excitement of the second transducer 114. In normal operation, the primary level and the secondary level should be substantially the same (for example, within approximately 3-5% of each other). However, should the tank 102 and/or the sensor 106 experience abnormal operation, the primary level and the secondary level may differ more significantly (for example, greater than 5% different). Accordingly, at block 322, the controller 116 may output a level confirmation signal to indicate whether the tank 102 and/or the sensor 106 are experiencing normal operation or abnormal operation. The output level confirmation signal may include the exact levels of the primary level and the secondary level, the difference between the primary level and the secondary level, and the like. Additionally, the output level confirmation signal may be in a digital or analog form. When the tank 102 and/or the sensor 106 are experiencing abnormal operation, the controller 116 may output an error code describing the abnormal operation. Additionally, the controller 116 may determine that the top surface 104 has reached a critically low level. Accordingly, the error code may include a notification that the fluid 103 is too low for operation and needs to be refilled and/or replaced. The error code may be included within the output level confirmation signal or may be transmitted separate from the output level confirmation signal.

If the top surface 104 is greater than the level of the target 112, at block 324, the controller 116 establishes operating parameters for the second transducer 114 (similar to as described in block 312). In some embodiments, the operating parameters for the second transducer 114 at block 324 are different than those established at block 312. At block 326, the controller 116 excites the second transducer 114 to generate an ultrasonic sound wave (for example, a third sound wave), as previously described. The second transducer 114 is excited based on the established operating parameters. At block 328, the controller 116 receives a reflection signal from the second transducer 114, as previously described.

At block 330, the controller 116 calculates the speed of sound. The speed of sound may be calculated based on the time of flight of the third sound wave and the distance to the level of the target 112. At block 332, the controller 116 calculates the concentration level of the fluid 103, as previously described. At block 334, the controller 116 outputs a concentration confirmation signal. The concentration confirmation signal may include the concentration level of the fluid 103. In some embodiments, the concentration confirmation signal also includes the level of the top surface 104 calculated in block 308. The concentration confirmation signal may be in either analog or digital form. In some embodiments, the controller 116 monitors a percentage of water within the fluid 103 using the calculated concentration level. The controller 116 may compare the concentration level of the fluid 103 to an expected concentration level. For example, should the percentage of water within the fluid 103 exceed a water threshold (for example, an expected concentration level), the controller 116 generates an error code. In some embodiments, the percentage of water within the fluid 103 should be less than 3%. If, based on the concentration level of the fluid 103, the controller 116 determines the percentage of water is less than 3%, the controller 116 does not output an error code. If, based on the concentration level of the fluid 103, the controller 116 determines the percentage of water is greater than or equal to 3%, the controller 116 outputs an error code. The error code may contain a notification to replace the fluid 103 and/or perform maintenance on components of a braking system associated with the sensor 106.

Thus, embodiments provide, among other things, a sensor for measuring temperature, fluid level, and concentration of brake fluid. Various features, advantages, and embodiments are set forth in the following claims.

What is claimed is:

1. A fluid sensing system comprising:
   a target positioned at a target level;
   a first transducer configured to generate a first sound wave in a vertical direction and to detect a first echo of the first sound wave;
   a second transducer configured to generate a second sound wave in the vertical direction and to detect a second echo of the second sound wave; and
   an electronic processor configured to:
   produce a first signal to drive the first transducer to produce the first sound wave,
   receive a first indication of the first echo from the first transducer,
   determine a first level of the fluid based on the first indication,
   determine the first level of the fluid is less than or equal to the target level,
   produce, in response to determining the first level of the fluid is less than or equal to the target level, a second signal to drive the second transducer to produce the second sound wave,
   receive a second indication of the second echo from the second transducer, and
   determine a second level of the fluid based on the second indication.

2. The system of claim 1, wherein the electronic processor is further configured to:
    determine the first level of the fluid is greater than the target level,
    produce, in response to determining the first level of the fluid is greater than the target level, a third signal to drive the second transducer to produce a third sound wave,
    receive a third indication of a detected third echo from the second transducer,
    determine a speed of sound based on the third indication and the target level, and
    determine a concentration level of the fluid based on the speed of sound.

3. The system of claim 2, wherein the electronic processor is further configured to:
    calculate a difference between the concentration level of the fluid and an expected concentration level of the fluid, and
    generate, in response to the difference being greater than a concentration level threshold, an error code.

4. The system of claim 2, wherein the system further includes a temperature sensor configured to detect a temperature of the fluid, and wherein the concentration level is further based on the temperature of the fluid.

5. The system of claim 1, wherein determining the first level of the fluid is further based on a speed of sound stored in a memory communicatively coupled to the electronic processor.

6. The system of claim 1, wherein determining the second level of the fluid is further based on a speed of sound determined by comparing the temperature of the fluid to a table stored in a memory communicatively coupled to the electronic processor.

7. The system of claim 1, wherein the electronic processor is further configured to:
    calculate a difference between the first level of the fluid and the second level of the fluid, and
    generate, in response to the difference being greater than a level error threshold, an error code.

8. The system of claim 1, wherein the system includes a focus tube configured to direct the second sound wave in the vertical direction.

9. The system of claim 8, wherein the focus tube reduces interference between the first sound wave and the second sound wave.

10. The system of claim 8, wherein the focus tube includes a base and a top, and wherein the focus tube narrows over the vertical direction defined by the distance between the base and the top.

11. An electronic processor configured to:
    produce a first signal to drive a first transducer to produce a first sound wave,
    receive a first indication of a first echo from the first transducer,
    determine a first level of a fluid based on the first indication,
    determine the first level of the fluid is less than or equal to a target level,
    produce, in response to determining the first level of the fluid is less than or equal to the target level, a second signal to drive a second transducer to produce a second sound wave,
    receive a second indication of a second echo from the second transducer, and
    determine a second level of the fluid based on the second indication.

* * * * *